US 8,499,148 B2

(12) United States Patent
Eng et al.

(10) Patent No.: US 8,499,148 B2
(45) Date of Patent: Jul. 30, 2013

(54) SYSTEM AND METHOD FOR VIRTUAL TEAM COLLABORATION IN A SECURE ENVIRONMENT

(76) Inventors: Chi Eng, Wayne, NJ (US); Eugene Dmytrichenko, Kramatorsk (UA); Eugene Myasushkin, Kramatorsk (UA)

( * ) Notice: Subject to any disclaimer, the term of this patent is extended or adjusted under 35 U.S.C. 154(b) by 335 days.

(21) Appl. No.: 12/938,355

(22) Filed: Nov. 2, 2010

(65) Prior Publication Data

US 2011/0107088 A1    May 5, 2011

Related U.S. Application Data

(60) Provisional application No. 61/257,307, filed on Nov. 2, 2009.

(51) Int. Cl.
*H04L 29/02* (2006.01)
*G06F 21/00* (2006.01)

(52) U.S. Cl.
USPC .......... 713/155; 713/168; 713/182; 709/204; 709/205; 705/50; 705/51; 705/52

(58) Field of Classification Search
USPC ............... 713/155; 380/44; 705/50–52, 64, 705/71; 709/204, 205
See application file for complete search history.

(56) References Cited

U.S. PATENT DOCUMENTS

| | | | | |
|---|---|---|---|---|
| 6,173,402 B1 * | 1/2001 | Chapman | ...................... | 713/182 |
| 6,836,845 B1 * | 12/2004 | Lennie et al. | ................. | 713/181 |
| 7,110,548 B1 * | 9/2006 | Ougi et al. | ..................... | 380/278 |
| 7,177,904 B1 * | 2/2007 | Mathur et al. | ................ | 709/204 |
| 7,730,543 B1 * | 6/2010 | Nath | ................ | 726/27 |
| 8,015,116 B2 * | 9/2011 | Crandell | ......................... | 705/64 |
| 8,065,417 B1 * | 11/2011 | Richardson et al. | .......... | 709/226 |
| 8,161,120 B2 * | 4/2012 | Tan | ................ | 709/206 |
| 2004/0133785 A1 * | 7/2004 | Kugai | ........................... | 713/182 |
| 2005/0108133 A1 * | 5/2005 | Balasubramanian et al. | .. | 705/35 |
| 2006/0015631 A1 * | 1/2006 | Bregant-Belin et al. | ...... | 709/230 |
| 2008/0065905 A1 * | 3/2008 | Salessi | .......................... | 713/193 |
| 2009/0248482 A1 * | 10/2009 | Knyphausen et al. | ............ | 705/9 |
| 2009/0327232 A1 * | 12/2009 | Carter et al. | ...................... | 707/3 |
| 2010/0241971 A1 * | 9/2010 | Zuber | ........................... | 715/753 |

* cited by examiner

*Primary Examiner* — Linglan Edwards

(57) ABSTRACT

A computing platform for facilitating dynamic connection and collaboration of users to transact services in a secure computing environment. The users include service providers and service requesters. The platform includes a registration module for registering users including service requesters and service providers, a connection module for connect users to form groups based on users' selective invitations to other users, and a collaboration module for creating a virtual secure data room for collaboration and sharing of encrypted data by the connected users in a user-friendly and transparent manner. The platform further comprises a transaction module for settling payments between the service requesters and the service providers based on completion of previously agreed project milestones.

14 Claims, 5 Drawing Sheets

SYSTEM AND METHOD FOR VIRTUAL TEAM COLLABORATION IN A SECURE ENVIRONMENT

CROSS REFERENCE TO RELATED APPLICATIONS

The present application claims priority to an earlier filed U.S. Provisional Patent Application No. 61/257,307, filed on Nov. 2, 2009.

BACKGROUND OF THE INVENTION

1. Technical Field

The present invention relates to a method and system for the delivery and provision of professional services using an internet-based platform capable of sharing resources.

2. Background

The traditional market for professional services is highly fragmented and inefficient due to the varying and diverse expertise of the professionals and the industries they serve. Take for example, the legal industry. Lawyers are licensed in disparate jurisdictions and specialized in distinct fields. They have different levels of experience and operate at varying levels of competence. While large law firms are able to bring together various niche services providers to aggregate supply, they make up for only a fraction of the legal community and contribute to its rigid and hierarchical "old-school" nature.

Presently, the supply-side architecture of the legal services industry lags other industries. Lawyers use software applications for their billing, office and case management. However, the legal profession has not yet adopted the now available web-based technology to provide legal services to their clients. They also don't typically collaborate online with other lawyers throughout the entire deal process (from sourcing to final payment). While there are online databases such as Martindale-Hubble, these services do not allow for meaningful interaction, collaboration or transactions (i.e. the full legal experience). The problem is that they resemble more closely to an online phonebook than an interactive exchange where legal service providers and service requesters or consumers conduct business.

According to Thomson Research, consumers demand greater efficiency and transparency of online legal services. Consumers are frustrated with navigating an ever-increasing volume of legal information online as they are untrained or inexperienced in digesting this over-saturation of seemingly unrelated and fragmented data. Thomson Research also suggests that evaluating the credibility of legal information and legal professionals is equally difficult. The problem is that while consumers are being serviced in other industries via the Internet, the legal profession has lagged further behind.

An inefficient marketplace is typically manifested by a large variation in prices for a given quality of service. In the present system, a great majority of legal service providers charge their clients based on billing rates. They bill varying hours for the same product, with larger firms commanding the highest rates. Thus, for the same quality of legal service, the price of the work product can vary greatly.

For many lawyers, large percentages of revenue often lie within few customers. Loss of one major client can have significant repercussions. This is particularly evident for the thousands of long-tail/mid-tail providers, who have limited relationships and compete against larger counterparts with global reach. As a result, smaller firms and lawyers often lose new business because they can only service 60-80% of a client's needs. While these lawyers are more likely to adopt new technology, there have been no complete solutions to date for on-demand collaborations with the clients and other out-of-network legal professionals including assistants, paralegals, and consultants, in a virtual or online environment. Moreoever, there is a perceived drawback of online systems that one must contend with a reduced level of confidentiality, security and control. For litigators, there is the worry that it could mean a loss of attorney-client privilege.

Accordingly, there is a need for a secure platform that facilitates the formation and management of client and professional teams possessing the requisite talents for specific projects and the efficient collaboration of team members in a virtual or online workroom.

SUMMARY OF INVENTION

An object of the present invention is to provide a method and system for harnessing the network effect of professionals in a virtual or online space even though such professionals may be physically located in disparate and far-flung geographical regions.

Another object is to provide an intuitive, simple-to-use user interface for requesters or consumers of professional services to access and seek optimal price and performance from such networks of professionals.

Still another object is to provide a secure online portal to facilitate the connection and collaboration of professionals through a wide area network such as a packet switched network such that professionals having different skill sets and located in different geographical regions will be able to share knowledge and skills and to network and collaborate with each other on complex projects in an efficient and cost effective manner.

Yet another object is to provide a secure workroom to enable collaboration among authorized professionals of a team to selectively share encrypted documents in a confidential but yet user-friendly manner.

According to the present invention, a system comprising a server or group of servers is configured to enable and to facilitate the dynamic or on-demand connection of computing devices to form one or more closed networks or teams of professionals for the purpose of collaborating on a project-by-project basis or on a fixed term relationship.

In a presently preferred embodiment, the inventive platform is configured on servers and storage devices provided by large scale networked data centers accessible through broadband networks. The servers include a database server, an application server, a web server, and a media server. The database server includes data relating to the identity of individual profiles of professionals and a plurality of networks of access devices, a secure data room accessible only by authorized access devices for sharing data and files among the networked professionals. The web server also includes an input module for collecting requests for services including budget and pricing information for a project, presenting such requests to the access devices of the professionals, and displaying bids from the service providers to the requesters. A transaction module is also provided for credit management including managing payments corresponding to specific milestones agreed to by the parties. A request filter parses the service requests and derives indicia of professional services in terms of the relevant expertise, which indicia will be used for searching or matching with relevant service providers. A matching module matches the service requesters to the service providers on the platform.

The various features of novelty which characterize the invention are pointed out with particularity in the claims annexed to and forming a part of the disclosure. For a better understanding of the invention, its operating advantages, and specific objects attained by its use, reference should be had to the drawings and descriptive matter in which they are illustrated and described preferred embodiments of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements.

DETAILED DESCRIPTION OF THE PRESENTLY PREFERRED EMBODIMENTS

Figure 1:
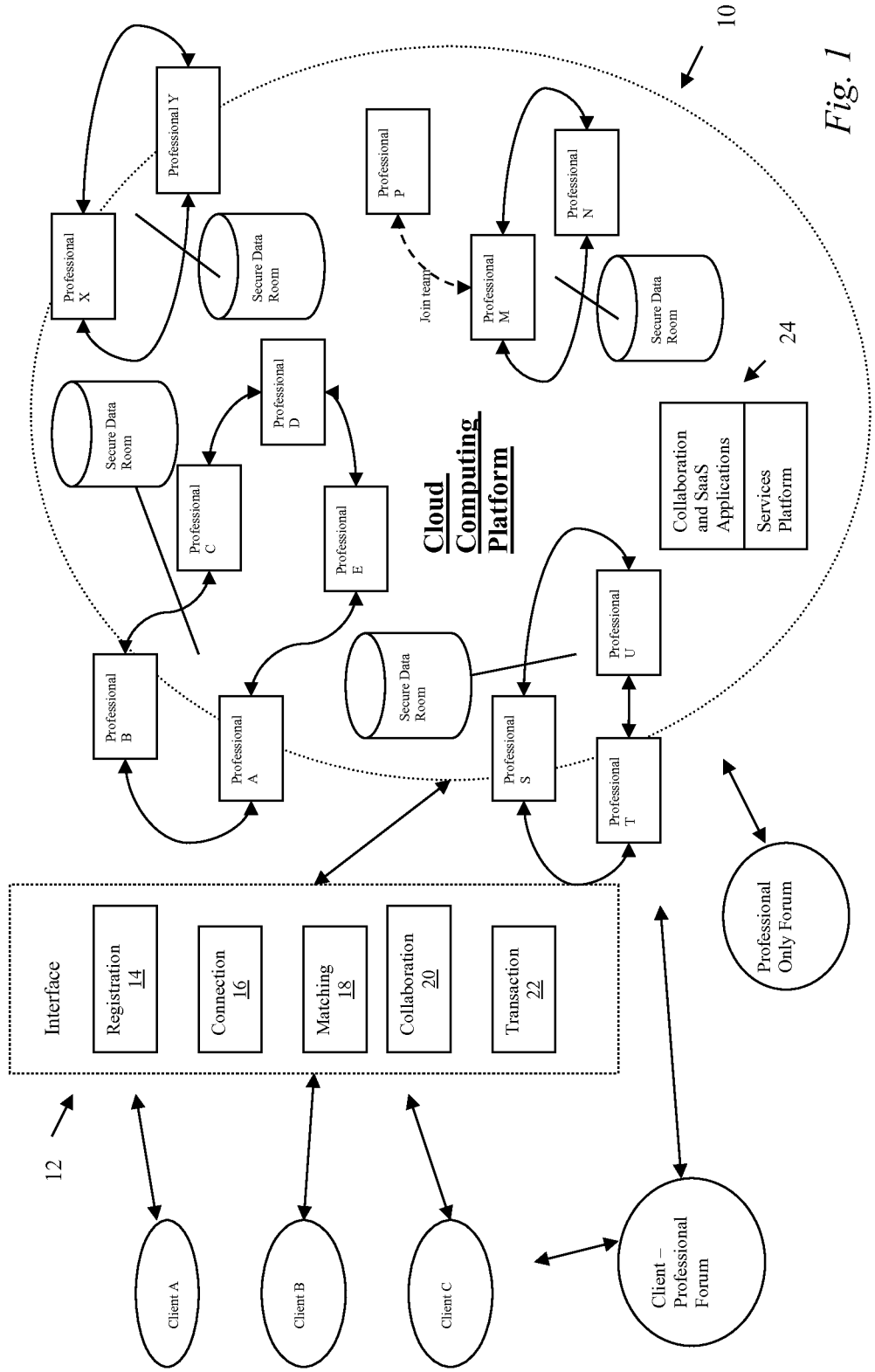
FIG. 1 is a diagram of an embodiment of the inventive system facilitating the connection, collaboration and transaction between client and professional teams of the present invention.

Preferably, the inventive system is implemented on a cloud-computing services platform (the "cloud platform") accessible by users around the globe via a packet-switched network such as the Internet. The cloud platform provides the inventive system with operational, fault-tolerant and service-specific security processes as well as redundancies by using highly scalable servers (i.e. ability to add servers on demand) in diverse geographical locations. It also provides a virtualized computing application layer for implementing a variety of software services for the inventive system such as those disclosed herein. Since confidential documents and messages are shared among them and payments are transacted among the service providers and requesters, security and reliability of the system are of paramount concerns to the users of this system.

The system is preferably built pursuant to applicable ISO 9000 standards and is configured to utilize security features of a cloud computing platform for certification and accreditation pursuant to SAS70 Type II or equivalent. Unlike popular online social networks, such security features are necessary for the provision of professional services and will be demanded by both the providers and clients.

In a presently preferred embodiment, the inventive system includes a database server, an application server, a web server, and a media server. The database server includes data relating to the identity of individual profiles of professionals and a plurality of networks of access devices, a secure data room accessible only by authorized access devices for sharing data and files among the networked professionals. The web server also includes an input module for collecting requests for services including budget and pricing information for a project, presenting such requests to the access devices of the professionals, and displaying bids from the service providers to the requesters. A transaction module is also provided for credit management including managing payments corresponding to specific milestones agreed to by the parties. A request filter parses the service requests and derives indicia of professional services in terms of the relevant expertise, which indicia will be used for searching or matching with relevant service providers. A matching module matches the service requesters to the service providers on the platform. In brief, the system facilitates the connection and collaboration of providers to transact services with clients. The collaborative system provides three primary functionalities to the users: (1) ability to selectively connect or network with other registered users (e.g., members of their teams and select service providers) in the system, (2) ability to collaborate with authorized and registered users in a secure data or work room, and (3) ability for service requesters to manage agreed milestones and to transact payments corresponding to the agreed milestones.

Users may be requesters for professional services such as legal services; the users may also be service providers such as attorneys or accountants. Each user is required to register and to provide profile information that may be used for authentication, networking, and matching purposes. In the case of a corporate user, the requested information will include the name of the company, place of organization, year started, address, name of contact, and annual revenue etc. For service providers such as attorneys, the information will include his name, address, jurisdictions in which they are licensed to practice their professions, academic and other credentials, professional experience, and practice profile, etc., which will be useful for the matching module to match them to the service requesters or for a connection module to facilitate the connections among the users. The users may also be assistants or paralegals of the attorneys or the service requesters. In a presently preferred embodiment, the matching module includes a search engine.

There is shown in FIG. 1 a presently preferred embodiment of the virtual collaborative system 10 constructed in accordance with the present invention. The system comprises an Interface 12 for interaction among service requesters (e.g., clients) and service providers (e.g. professionals), who may be collectively referred herein as "users", which includes a Registration Module 14, a Connection Module 16, a Matching Module 18, a Collaboration Module 20 and a Transaction Module 22. Users may access the system via any access devices with appropriate software applications to communicate with the servers on the cloud platform. Such access devices may include PCs, Macs, smart phones, or other client devices. A user is required to register with the system through the Registration Module 14 and his profile and contact information is stored in a searchable database. Once registered, the users may search and connect with each other, thereby forming groups of users with shared interests or goals. These connected users may share a common message board to communicate with each other. They may also set up a virtual secure data room from which they can upload and download files for collaboration. The service requesters or clients may also connect with their own employees/agents and share their data room. In one scenario, the clients may invite service providers to collaborate on a previously established project through their virtual data room, and which will eliminate the need for sending files to each other via email servers that could block or misidentify emails as spam emails and never deliver the legitimate emails to the intended recipients. Worse yet, the emails which are typically transmitted in unencrypted form may be intercepted by third parties. As shown in FIG. 1, the secure data rooms form the basis for collaboration for each virtual team. Online collaboration applications (similar to Google Docs) may be provided to the users for greater productivity efficiency. The teams may be formed or dissolved on demand depending on the projects shared by the team members; the data rooms may likewise be formed or disassembled on demand.

The service requesters may submit a project to the Interface 12 for bidding by the various virtual teams on the platform. Recognizing the requesters lack the requisite sophistication to seek the most qualified providers, the matching module 18 matches the project requirements to relevant service providers and ranks them in accordance with the project parameters and the providers' profiles. Specifically, the matching module 18 analyzes the project description by way of keywords used by the requester and associated metadata and searches through the profiles of the providers to determine the number of keywords or metadata matched and derive a relevance ranking. The matching module 18 may also make use of a request input filter which parses the written project description from the client and extracts important parameters for processing by the matching module 18. The more keywords, metadata and project parameters are matched, the more relevant the provider is to the project. Once the providers are identified, the system forwards the project to the identified providers via a previously specified communication method (e.g., email or SMS or posting via the platform to the identified providers) and requests them to respond to the request for bids within a specified time period.

To facilitate on-demand collaboration among the providers, the transaction module provides revenue splitting based on previously agreed percentages. Thus, prior to submitting a bid, the providers may agree to a certain revenue split among them and which percentages are entered into the Transaction module 22 such that when payments are released for a completed milestone, the transaction module automatically divides and distributes the payments to the team members.

To further enhance collaboration among the users, the system may issue virtual currency to the users, which may be used for trading by the users in order to obtain certain privileges or rights. This concept is akin to the airlines' frequent mileage programs. Accordingly, providers will accumulate increased amount of virtual currency the more they use the services provided by the platform. Virtual currency can be used by users to barter and negotiate with other registered users. Virtual currency may also allow the users to, for example, trade or purchase leads from other users in an open market place on the platform. In the case of lawyers, the virtual currency could also allow them to obtain sample legal papers (e.g., motion papers and form contracts), and negotiate various deals as a part of a virtual team/firm. The platform will allow for virtual currency to evolve and increase in value. In a preferred embodiment, the virtual currency is in the form of points provided to registered users of the platform. These points may be used for bidding on proposed projects by the service providers. Additional points may be purchased at a predetermined price.

The modules are further described in more details as follows.

Registration Module

The Registration Module 14 is configured to collect user contact information and profile description which may be made searchable by other users. For example, the profile description may include keywords and meta-tags associated with the particular user and which are stored in a searchable database. The Registration Module 14 may also collect photos, credentials, and documents for enhancing the credibility of the professional service provider. This module may also include an algorithm for authenticating the users. For service providers who are lawyers, and who received license registration numbers from their respective jurisdictions, they will be required to submit such registration numbers. Upon receipt of a registration number from a user, the module performs verification with an internal or external database containing bar registration numbers of lawyers in the various jurisdictions.

An exemplary registration form may include the follow fields: Email address; Password; Name of User; Screen Name (to be selected by user)—minimum number of characters; Name of Company or Firm (if applicable); Full Postal Address; Wireline phone number; Mobile phone number; Fax number; Email address; Website address; Profile or Bio (note that this field is searchable by other users depending on privacy settings.); and Keywords, metadata, and meta-tags for facilitating searching by or for connection with other users and for matching with projects proposed for bidding by clients. The metadata or keywords may include words typically used in such legal fields, for example, as real estate, intellectual property, securities laws, litigation, corporate governance, international tribunals, cross-border transaction, and commercial law, etc.

A database schema is configured to categorize the professional interests of the providers and their experience and skill levels for efficient indexing by the system. Such data will be used for searching by clients and other users, and will facilitate project team formation among the users, especially when a project is submitted by a client for bids for a defined period of time, and the necessary talents must be located quickly to prepare a responsive bid. The database architecture will be later described in connection with FIG. 2.

Connection Module

Advantageously, the Connection Module 16 provides the users the ability to dynamically network with each other and form increasingly diverse project teams to collaborate on ever more complex projects. Initially, the users may invite other registered users so as to form a distinct network or groups whose members share common interests or goals. The system tracks the relationships of the various users through a user database. The users form project teams by inviting members of their existing networks or invite others outside their networks based on the needs of the project at hand. Each user's login page will show his connections, project teams, data room(s) (where documents are stored and displayed), and status of his projects.

The Connection Module 16 may include the following features:

Upload profile content—Registered users would be able to upload additional content to their respective profiles including photos, document, credentials, etc., up to a predetermined storage size.

Edit & Manage profile—Once user has created his/her profile then user can also manage his profile. He would be able to make changes from time to time. Here users would also be able to select visibility or privacy option for their profiles so that a portion of his profile would be visible to all users on the platform, and another portion of his profile will only be visible to authorized users.

See others' profiles—Users would be able to see other users' profiles, the visibility of other users profile would depend on the privacy option selected by the respective users.

Search users—This feature will help user search each other using different criteria as described herein.

Add/remove "Connections"—Users would be able to add or remove other users in their profile, thereby enabling users to customize their networks on the platform.

Send and receive messages—This feature will allow users to send/receive messages to other users on the platform or to members of his network.

Connect with other users—Connected users would also be able to create their own "group" or "virtual firm" through invitations.

Create Events—Users of the website would also be able to create events on the websites, users can send invitation to other users to take part in these events and other users can accept or deny the request for the event.

Provider Only Forum—Users would be able to engage in open discussions with other users of the website with identifiable discussion threads.

Matching Module

To alleviate the needs of a client to have a thorough understanding of the various professional disciplines in order to identify the appropriate service provider(s) for a project, the Matching Module 18 implements intelligent business rules for determining relevant service providers for the client. For example, the client, in his description of a proposed project, is required to input certain keywords or metadata in a designated field. The keywords or metadata are stored and indexed in the database, and will be used to match with service providers who also input the same keywords in their profiles. Likewise, the providers are required to input in a field keywords, parameters, metadata that are pertinent to their expertise, which data are stored in a database for later matching with the project description parameters entered by the client. The business rules may further require that if the project description mentions certain keywords, and which are matched with keywords stored in a provider's profiles, the provider will receive the client request and will determine whether and how to respond to such request within a given time period set by the client.

The Matching Module 18 will rank relevant service providers based on the number of matched parameters and provide the list of such providers to the client. The service provider with the greatest number of matched parameters will have the highest relevance ranking. In this way, the client can more intelligently sort through potential providers for a project.

Collaboration Module

Secure Data Room

To facilitate collaboration among project team members, the Collaboration Module 20 provides virtual secure data rooms and online collaboration tools for use by the team members. The virtual data rooms may be secured using well-known security mechanisms such as firewalls, authentication, and encryption technology (e.g., S-HTTP specified in RFC 2660, or HTTPS). The secure data rooms may be configured by a Data Room File Server containing the contents of the files in the data rooms and a Database Server including data that relate to and define the attributes of the data room files and folders accessible by specific authorized users of the data room; for example, each authorized user could have the same or different viewing or editing rights to select files and folders in the data room. For another example, an authorized user may have rights to upload files to a specific folder but have only viewing rights to other folders or no viewing rights to any other folders in the data room. The owner of the data room will have administrative rights to tailor access to his data room. A presently preferred embodiment of an algorithm for sharing documents and data are later described in connection with FIGS. 2 through 4.

The secure data room is preferably configured to provide the following functionalities:

An owner of the data room is able to designate or invite other registered users on the platform to view, edit, upload and/or download files to one or more folders in the data room designated by the owner.

The owner is provided with statistics including who and when the files were viewed, edited, uploaded and/or downloaded.

The owner is able to create and name folders in the data room.

Authorized guests are able to view only the designated shared folders.

The data room is subdivided such that a first group of authorized users can view a first set of folders while another group can view another set of folders.

Ability to measure the amount of storage space used by the data room.

Ability to limit the amount of data used in the data room, and the amount of data transferred to and from the data room based on the owner's purchased usage threshold (e.g. membership level).

Ability for owner to automatically pay for the increased data and bandwidth usage.

Ability to handle transfers of large blocks of files.

Ability to handle large numbers of concurrent users in a scalable manner.

Ability to encrypt data for uploads and downloads.

Collaboration Tools

To further enhance productivity and collaboration by the project team members, the system may provide additional online application software (similar to Google Docs) which does not require users to upload and download of documents. Provided there is sufficient bandwidth capacity, the use of such online software will be transparent to the users and the experience will be the same as if the application software is being run by the users' computing devices. In fact, the online software (or Software as a Service (SaaS)) or other collaboration application tools 24 is executed by the servers, and the user devices merely receive data from the servers and displayed by, for example, a web browser. In this way, the users collectively share the resources on the cloud platform, which would result in lower license fees. More importantly, the data and applications are not tied to any user device thereby increasing the mobility of the users and enabling the users to access and share their data anywhere around the globe.

After completion of a project, each of the client and the provider will have an opportunity to rate his experience. Such ratings will be published to all registered users and will serve as a vehicle to increase the quality of both the clients and the providers. Providers will be incentivized to provide the high quality service while the clients will also be encouraged to work fairly and efficiently with the providers. Consequently, the highly rated provider will be able to charge higher price because of his higher quality of work while the highly rated client will be able to attract higher number of bidders for its projects and thus able to negotiate a lower price for the project.

Transaction Module

The Transaction Module 22 comprises a payment interface to transact payments through a generally recognized financial payment processing institution ("FPPI") and an escrow deposit and release functionality manageable by a client, which is also tied to a project milestones management system. The payment interface includes an Application Programming Interface (API) for interfacing with the FPPI to communicate credits and debits to the user accounts. The escrow functional feature is a dashboard where a client can manage payments for the various agreed milestones for his one or more projects. The dashboard preferably displays to the service providers the various projects in progress, the agreed milestones and payments for each project, the identification of the providers for each project, and a clickable communication link that enables the client to send messages to the service providers and a message board(s) to receive messages from the providers.

The Transaction Module 22 may provide the following features:

Project Awarded—Provider will be notified once the project is awarded by client via email, SMS texting, or other previously specified method of communication.

Accept Project—Service provider will need to electronically accept the awarded project to complete the engagement. In case they feel the need to add team members, they can invite other providers on the platform to join the project after negotiation of revenue split.

Preview of work product—portions of the provider's work product may be selectively displayed by, for example, a Flash player, to the client for his approval and to mitigate the risk of unauthorized copying before payments. The provider may be provided with appropriate controls to determine which portion(s) of his work product may be shown to the client prior to payment of the milestone, and the platform will convert the file into Flash format for client's review. After review, the client may click a release-of-funds button on a client dashboard, or reject the work product, and provide further instructions to the provider.

Payment received—Once the payment is deposited into an escrow account, the provider will be notified or able to view the payment status on a provider dashboard prior to project commencement. Upon delivery or work product to the client, the corresponding milestone payment amount is released.

Revenue Split—Upon release of payment by the client for a completed milestone, the platform divides the payment according to previously agreed revenue split, if any, by the project team members and sends payments to the individual team members, thereby alleviating the needs of the project team members to post-payment negotiations with each other.

Feedback and comment—Client can rate the service providers (if they did not opt out) after project completion and give feedback and post comment to the client. Service providers can also rate the client (if client did not opt out) after completion of a project and give feedback and post comment to the client.

In a particularly preferred embodiment, the documents and messages on the inventive platform are encrypted and yet able to be shared with other users in a transparent and user-friendly manner. In other words, owners of documents and senders of messages to other users on the platform are ensured that their data are encrypted without requiring their further input such as supplying additional passphrases. Yet, their documents can be selectively shared with members of their teams, and messages are sent to their intended recipients—while the system encrypts and decrypts the data automatically in the background and without active intervention of the users.

Figure 2:
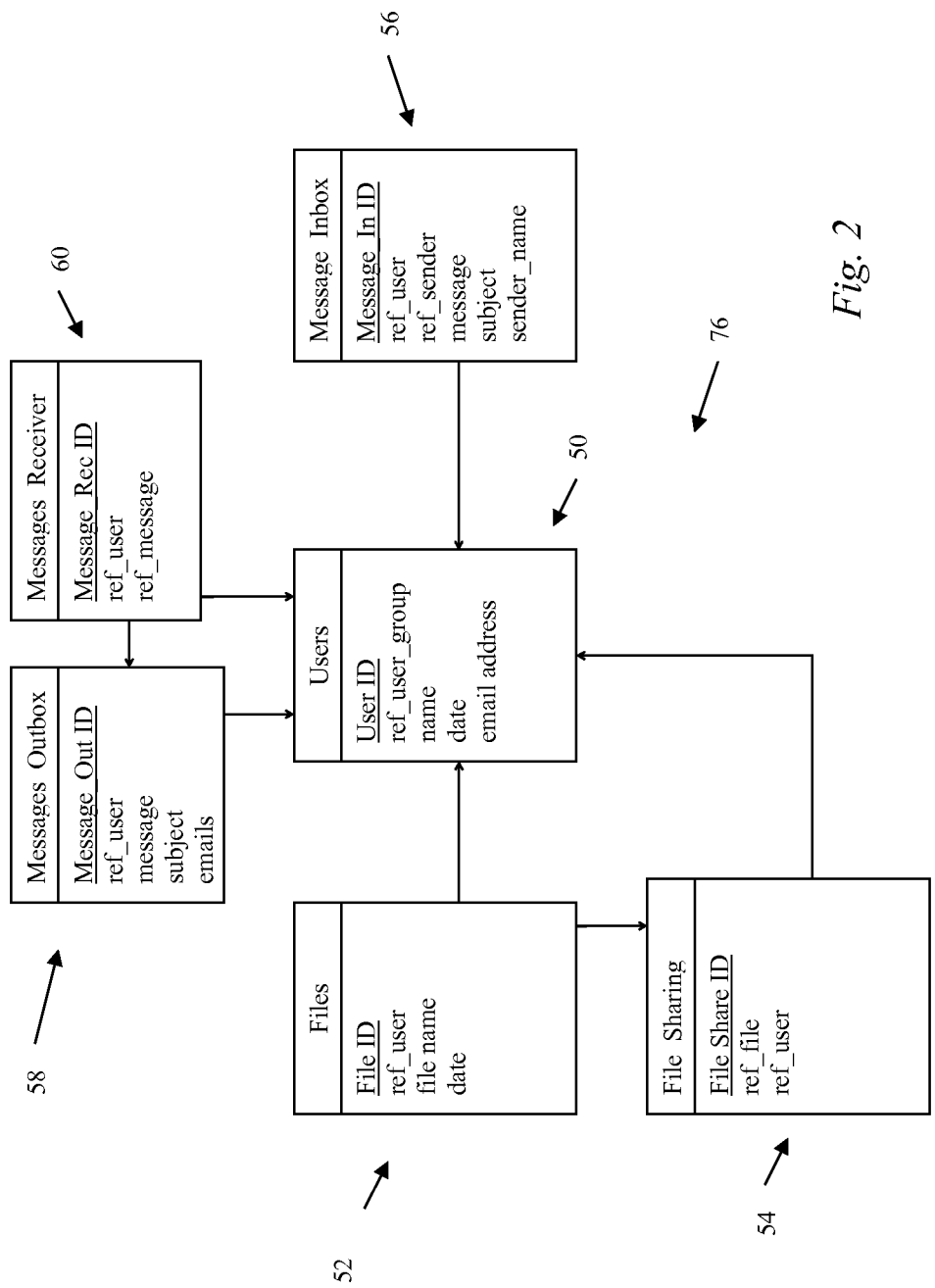
FIG. 2 is a portion of a relational database representing the relational tables of a User, the User's files, users with shared access to the User's files, and the User's messages with other users.

FIG. 2 shows a portion of relational database 76 comprising tables for a user, the user's files, and the user's messages etc. Specifically, the tables include (1) a User table 50 wherein each user is assigned a unique identifier (e.g., User_ID) and which contains user information such as user name, date of joining the platform, and email address etc.; (2) Files table 52 wherein each of the user's files is assigned a unique identifier (e.g., File_ID) and includes file data such as file name and date of creation, etc.; (3) a File Sharing table 54 which maps a list of users (including the file owner and shared users of a file) who have access to a corresponding list of files; (4) a Message Inbox table 56 which contains all messages received by a user and includes data fields for identifying the message sender (e.g., ref_sender), the message receiver (e.g. ref_user) and the specific message (e.g., Message_In ID); (5) a Message Outbox table 58 for storing messages sent to other users and since the messages are contained in two different tables, so that each recipient can now "delete" the message without affecting other users who have not "deleted" the same message; and (6) a Message Receiver table 60 for mapping each message to any user who has access to the message. Accordingly, through the use of the various parameters in this database, the system is able to track each user, the user's files, other users who were given access to the user's files by the user, and messages between the user and the recipients. As explained below, unique identifiers of a file or message and the user in combination with a system defined passphrase, will be used as input parameters for encryption or decryption of the file or message, which will be shared with users who have been granted access by the owner of such file or message.

The system may use any standard encryption algorithm but preferably employs the Advance Encryption Standard (AES), which comprises three block ciphers, AES-128, AES-192, and AES-256. Each of these ciphers has a 128-bit block size, with key sizes of 128, 192, and 256 bits, respectively. AES is the first publicly accessible and open cipher approved by the National Security Agency (NSA) for top secret information. For most applications, AES-128 offers the most optimal performance without compromising the security of the encrypted data. There are various readily available program modules that provide AES encryption capability.

In the presently preferred system, user documents and messages are encoded or decoded using separate AES encryption modules (and thus separate processors) for greater efficiency as documents are stored in storage devices and processed by an application server, while messages are processed and stored in a database server.

Figure 3:
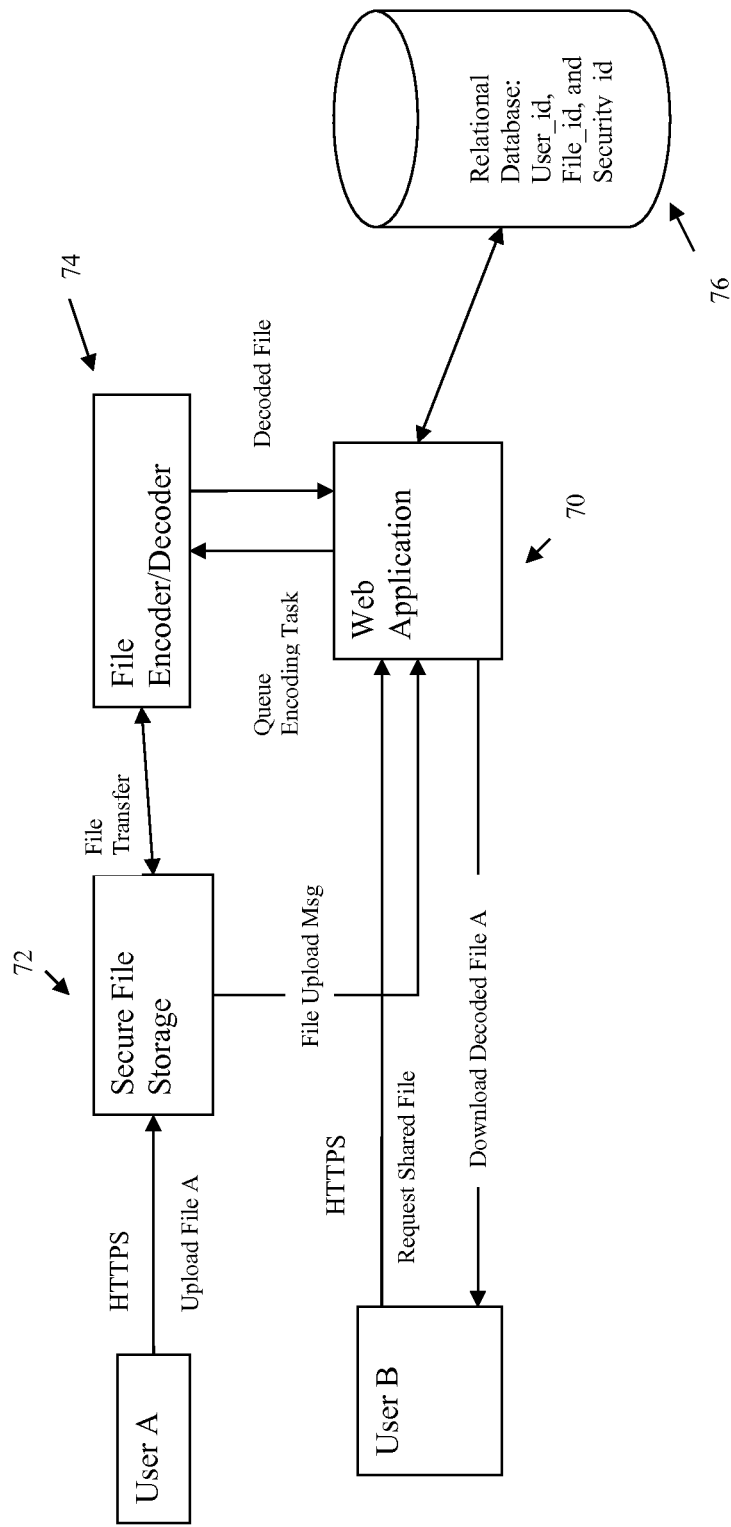
FIG. 3 diagrammatically illustrates the interplay of the file storage, the encoder/decoder and web application/server to enable sharing of encrypted files between users.

FIG. 3 diagrammatically illustrates how the system enables sharing of encrypted files between two or more users. The system includes a Web Application server 70 for interfacing with Users A and B, the secure file storage device 72, the Encoder 74, the Relational Database 76 containing the unique identifiers U_Id (identifying the users), the F_Id (identifying the files of each user). The system security key (S_Id) may be stored in either the Web Application or the Relational Databse 76. The Encoder 74 comprises an encryption/decryption software application as explained above and coupled with an advantageous use of input parameters to create an efficient and secure key for encryption and decryption.

As described in the flow chart of FIG. 3, User A uploads one or more files to a storage device, which in turn notifies a Web Application 70 to task an Encoder to encrypt the uploaded files for User A. The Web Application 70 receives the unique identifiers of User A (e.g., User_ID) and the files (e.g., File_ID) and passes these parameters to the Encoder 74. The Encoder 74 retrieves the uploaded files based on the User A's and the files' unique identifiers. Advantageously, without requiring the User A to provide a security passphrase, the Encoder 74 proceeds to encrypt the uploaded files based on the File_ID, User_ID, and a system assigned key (e.g. S_ID), which may be randomly generated by the system or manually defined by the system administrator. Preferably, a proprietary function may be created to combine File_ID, User_ID and the S_ID to generate a single string of characters for input into a standard AES encoder. Preferably, the system assigned key or passphrase is further compressed by a proprietary algorithm so that it is not readily recognizable by human in its stored form. In this manner, each file is encrypted with a unique combination of parameters thereby creating a robust encrypted data storage that would greatly minimize any security breach. Once completed, the Encoder 74 replaces the uploaded (and unencrypted) file with the encrypted file in the storage device 72. Assuming User A has subsequently shared this file with another user, User B, the system will permit User B to access the encrypted file of User A in a transparent manner. In contrast, conventional encryption methods would require User B to submit a passphrase unique to User A and will potentially require users to share passphrases of each other in order to collaborate. As shown, upon User B's request to download the shared file of User A, the Web Application 70 tasks the Encoder 72 to retrieve and decrypt the shared file. Upon completion, the decrypted file is allowed to be downloaded by User B.

Figure 4:
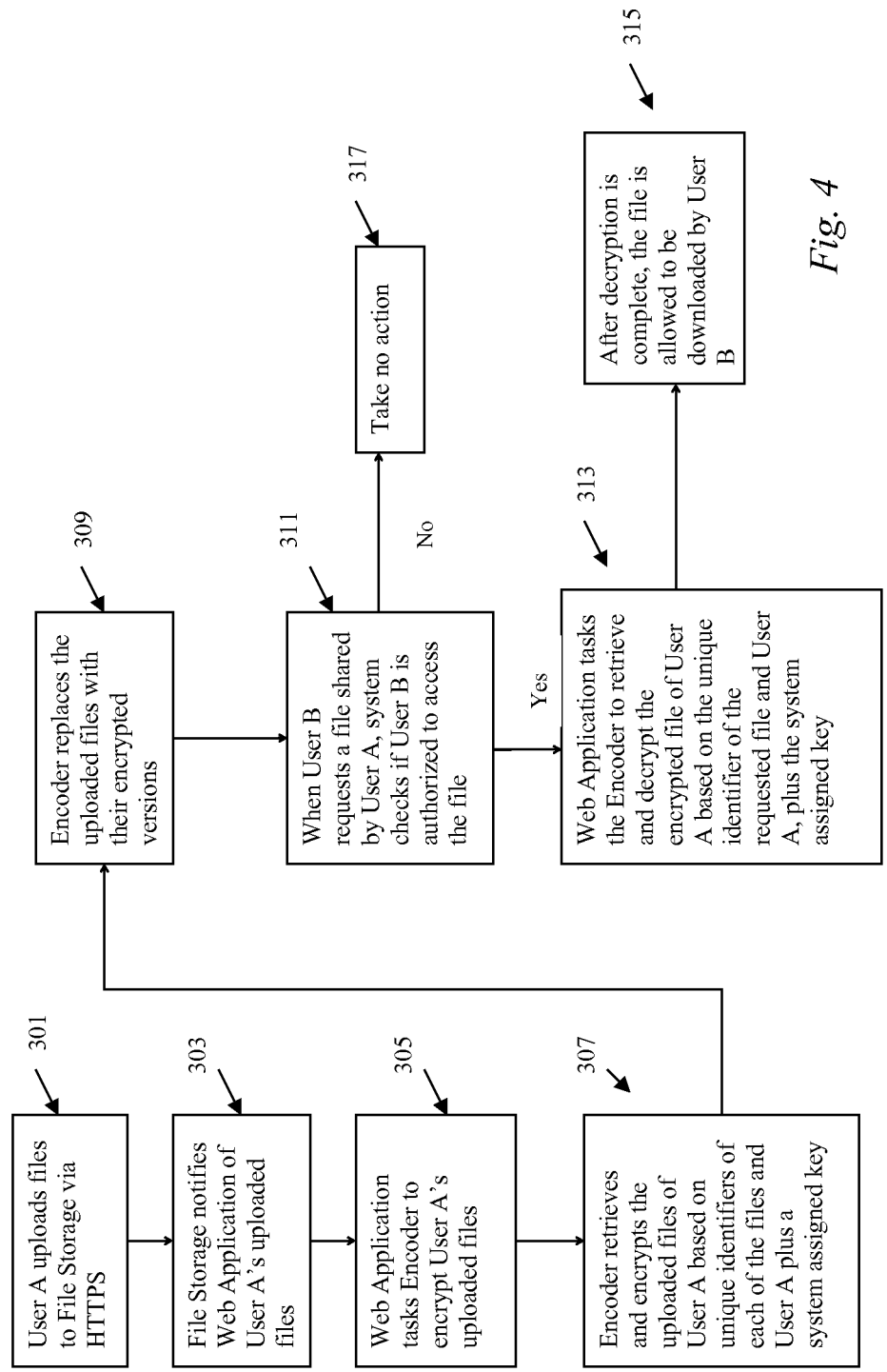
FIG. 4 describes the steps of sharing encrypted files in a manner transparent to the users.

To further delineate this secure collaboration process, FIG. 4 describes step-by-step an embodiment of this advantageous process. In Step 301, User A uploads files to File Storage 72 via HTTPS. In Step 303, File Storage 72 notifies Web Application 70 of User A's uploaded files. In Step 305, Web Application tasks Encoder 74 to encrypt User A's uploaded files. In Step 307, Encoder retrieves and encrypts the uploaded files of User A based on unique identifiers of each of the files and User A plus a system assigned key. In Step 309, Encoder replaces the uploaded files with their encrypted versions. In Step 311, when User B requests a file shared by User A, system checks if User B is authorized to access the file. If Yes, in Step 313, Web Application 70 tasks the Encoder 74 to retrieve and decrypt the encrypted file of User A based on the unique identifier of the requested file and User A, plus the system assigned key. In Step 315, after decryption is complete, the file is allowed to be downloaded by User B. If No, in Step 317, the Web Application takes no action.

Figure 5:
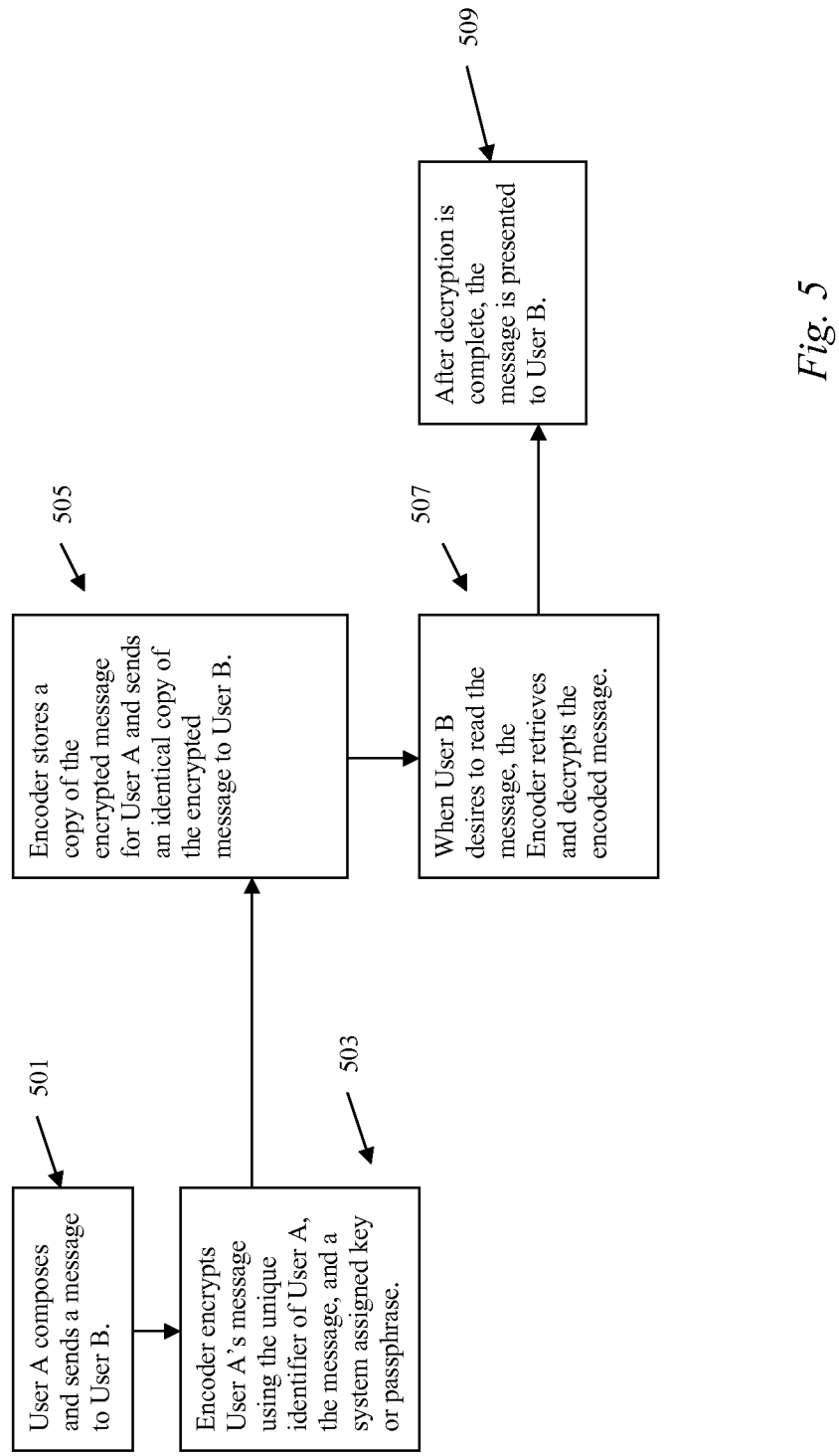
FIG. 5 is a flow chart illustrating the steps of communicating encrypted messages between users.

To completely secure the users' data, it is also necessary to encrypt the messages between the users on the platform. FIG. 5 describes the steps of encrypting a user's messages for storage and decrypting the messages for the recipient of such messages. Initially, in Step 501, User A composes and sends a message to User B. In Step 503, Encoder 74 encrypts User A's message using the unique identifier of User A, the message, and a system assigned key. In Step 505, Encoder 70 stores a copy of the encrypted message for User A and sends an identical copy of the encrypted message to User B. In Step 507, when User B desires to read the message, the Encoder retrieves and decrypts the encoded message. In Step 509, after decryption is complete, the message is presented to User B.

Although the inventive system has been described in terms of lawyers, it is contemplated that the system described herein is also applicable to other service providers such as, for example, accountants, consultants, and financial service professionals.

The invention is not limited by the embodiments described above which are presented as examples only but can be modified in various ways within the scope of protection defined by the appended patent claims.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A computing platform for facilitating connection and collaboration of users including service providers and service requesters in a secure computing environment, comprising:
   (a) a registration module for registering users including service requesters and service providers;
   (b) a data storage for receiving a set of data from a first registered user, wherein the set of data represents one of documents and messages of the first registered user;
   (c) a web application module for associating a first unique identifier with the first registered user and a second unique identifier with the set of data of the first registered user, and for defining a security passphrase;
   (d) an encoder for encrypting the set of data based on the first unique identifier, the second unique identifier, and the security passphrase;
   (e) a connection module for connecting the first registered user to form a group of connected users based on the first registered user's invitations to other registered users and for defining a subgroup of connected users based on the first registered user's invitations to the connected users for sharing the set of data;
   (f) a collaboration module for facilitating the sharing of the encrypted set of data between the first registered user and the subgroup of connected users without requiring the members of the subgroup to input any of the first and second unique identifiers and the security passphrase in order to receive the set of data in unencrypted form, wherein the collaboration module retrieves the encrypted set of data based on the first unique identifier and the second unique identifier, and the encoder decrypts the encrypted set of data for the members of the subgroup based on the first unique identifier, the second unique identifier and the security passphrase; and
   (g) a matching module for receiving requirements for a project from a second registered user who is a service requester and matching the requirements to one or more registered users who are service providers based on profiles of the registered users.

2. The platform of claim 1, further comprising a software program for generating a key by combining the first and second unique identifiers and the security passphrase, the key being subsequently used by the encoder to one of encrypt and decrypt the set of data.

3. The platform of claim 1, further comprising a transaction module configured to settle payments between the matched one or more registered users and the second registered user based on agreed project milestones.

4. The platform of claim 1, further comprising a work product preview module configured to allow the service requester to preview portions of a work product prior to payment of an agreed project milestone associated with the work product.

5. The platform of claim 4, wherein the work product preview module employs video streaming technology to display the portions of the work product.

6. The platform of claim 1, wherein the encoder uses Advanced Encryption Standard (AES).

7. The platform of claim 1, wherein the encoder uses AES-128.

8. A computer implemented method for facilitating connection and collaboration of users including service providers and requesters in a secure computing environment, comprising the steps of:
 (a) registering, using a computer processor, users including service requesters and service providers;
 (b) associating, using a computer processor, a first unique identifier with a first registered user;
 (c) defining, using a computer processor, a security passphrase;
 (d) connecting, using a computer processor, the first registered user to other registered users to form a group based on the first registered user's invitations to the other registered users;
 (e) receiving, using a computer processor, from the first registered user a set of data, wherein the set of data represents one of messages and documents of the first registered user;
 (f) associating, using a computer processor, a second unique identifier with the set of data;
 (g) encrypting, using a computer processor, the set of data using the first and second unique identifiers and the security passphrase;
 (h) sharing, using a computer processor, by the first registered user the encrypted set of data with select members of the group without requiring the select members to input any of the first and second unique identifiers or the security passphrase to receive an unencrypted form of the set of data;
 (i) retrieving, using a computer processor, the encrypted set of data using the first and second unique identifiers, and decrypting the encrypted set of data based on the first and second unique identifiers and the security passphrase;
 (j) receiving, using a computer processor, requirements for a project from a second registered user who is a service requester; and
 (k) matching, using a computer processor, the requirements to one or more registered users who are service providers based on profiles of the registered users.

9. The method of claim 8, further comprising the step of combining, using a computer processor, the first and second unique identifiers and the security passphrase to generate a key and wherein the steps of encrypting and decrypting uses said key.

10. The method of claim 8, further comprising the step of settling payments, using a computer processor, between the matched one or more registered users based on completion of previously agreed milestones.

11. The method of claim 10, further comprising the step of allowing, using a computer processor, the service requester to preview a portion of a work product of the matched one or more registered users prior to payment of a previously agreed milestone associated with the work product.

12. The method of claim 11, wherein the step of previewing work product uses video streaming technology.

13. The method of claim 8, wherein the step of encrypting uses Advanced Encryption Standard (AES).

14. The method of claim 8, wherein the step of encrypting uses AES-128.

* * * * *